United States Patent [19]

Grosgebauer et al.

[11] Patent Number: 4,999,997
[45] Date of Patent: Mar. 19, 1991

[54] RADIAL PULSE MOTOR IGNITER-SUSTAIN GRAIN

[75] Inventors: Roger A. Grosgebauer, Ogden; C. Max White, Brigham City, both of Utah

[73] Assignee: Thiokol Corporation, Ogden, Utah

[21] Appl. No.: 799,371

[22] Filed: Nov. 18, 1985

[51] Int. Cl.⁵ .............................................. F02K 9/04
[52] U.S. Cl. ........................................ 60/256; 60/250; 60/254; 60/255; 102/290
[58] Field of Search ................. 60/256, 250, 254, 255, 60/200 A; 102/103, 49.7

[56] References Cited

U.S. PATENT DOCUMENTS 4,085,584 4/1978 Jones .................................... 60/256

*Primary Examiner*—Donald P. Walsh
*Attorney, Agent, or Firm*—Arthur H. Swanson; Gerald K. White; A. H. Erickson

[57] ABSTRACT

A radial pulse rocket motor having a nozzle at the aft end includes longitudinally spaced hollow boost and sustain propellant grains in the combustion chamber thereof with an elongated tubular thermal barrier covering substantially the whole of the interior surface of the sustain grain to enable the production of separate boost and sustain pulses. At the forward end of the motor, mounted within a reentrant motor bulkhead position, is a multiple pulse arm-fire device which, when commanded, produces an igniting signal that is transmitted to a boost igniter for igniting the boost grain and a subsequent igniting signal that is transmitted to a sustain igniter for igniting the sustain grain. The sustain igniter is positioned in surrounding relation to the motor forward bulkhead reentrant portion, the multiple pulse arm-fire device, and the forward end of the tubular barrier, and comprises a consumable, molded, polyurethane case having two interlocking tubes with a thin 0.10 inch (2.5 mm.) wide annulus therebetween which contains a thin sheet of igniter propellant wrapped around and bonded to the inner tube. Upon completion of the burning of the boost grain and subsequent initiation of the sustain igniter, the operation of the sustain igniter produces a pressure of flaming gases externally of the forward end of the thermal barrier that is effective to turn the barrier inside out to expose the sustain grain to the flaming gases and to deposit the thermal barrier in the space previously occupied by the boost grain.

20 Claims, 3 Drawing Sheets

RADIAL PULSE MOTOR IGNITER-SUSTAIN GRAIN

BACKGROUND OF THE INVENTION

1. Field of the Invention

The present invention relates to improvements in radial pulse rocket motors having a plurality of solid propellant units therein and incorporating a thermal barrier that enables the ignition of the propellant units to be independent of each other whereby discrete pulses, specifically "boost" and "sustain" pulses are available upon command. The invention relates particularly to an improvement in the igniter for the sustain phase of such motors.

2. Description of the Prior Art

The entire propulsive capacity of a solid propellant rocket motor, is usually spent during the combustion process of one mass of solid propellant grain. This is for the reason that, once a solid propellant grain is ignited, it is very difficult to stop the combustion process until the entire mass of ignited propellant has been consumed.

Burning may be started by standard initiation means, knonw in the art, and may be of the "end" burn type or the "raidal" burn type. End burning is the burning of a tube or rod of propellant grain in a direction parallel to the axis of the tube or rod, and in a direction away from the nozzle of the rocket motor. Radial burning is the radial or outward burning internally of a tube of propellant grain with the total inner surface thereof being ignited.

It has been proposed in the prior art to provide solid propellant rocket motors of both the end burn and radial burn types with an ability to fire more than once, that is, a rocket motor with a "start-stop-restart" capability by providing two or more concentric layers or zones of solid propellant grain in a combustion chamber with a flame inhibiting or thermal barrier separating the layers, the barrier being made of a material that will confine the burning to a single layer or zone but which is rupturable and destructible so that the next adjacent layer may be ignited with the ruptured and destroyed barrier being blown out of the motor nozzle.

Radial burn prior art rocket motor arrangements that may be fired more than once are disclosed in U.S. Pat. No. 3,248,875 granted on May 3, 1966 to R. D. Wolcott, U.S. Pat. No. 3,293,855 granted on Dec. 27, 1966 to W. E. Cuttill et al, and U.S. Pat. No. 4,357,795 granted on Nov. 9, 1982 to T. W. Bastian et al. In the Wolcott patent heat insulating metal foil and individually associated electrically activated igniter bands are provided between each of several concentric layers of solid propellant grain for igniting, upon command, and in turn, each of the next adjacent layers. Similarly, the Cuttill et al patent discloses a pyrotechnic and an electrically ignitable film between each of several concentric layers of solid propellant for igniting each of the next adjacent layers, in turn. In the Bastian et al patent, a burn inhibitor layer is provided between each of several tandemly positioned layers of solid propellant grain and a separate igniter is provided for "radial" burn of each of the layers in turn. The Bastian patent also discloses the use of a burn inhibitor layer between each of several concentric layers of solid propellant grain and a separate igniter for each layer at the aft end of the motor for "end" burn of each of the next adjacent layers beginning with a central core.

Other similar prior art arrangements are disclosed in U.S. Pat. No. 3,564,845 granted to I. H. Friedman, Jr. et al on Feb. 23, 1971 and U.S. Pat. No. 3,568,448 granted to G. E. Webb, Jr. on Mar. 9, 1971 wherein the inner one of two solid propellant concentric layers that are separated by a flame inhibiting barrier is ignited by an aft end igniter. A rupturable membrane seal and perforated support member assembly is provided to isolate a gas generator from the motor combustion chamber during burning of the inner layer. Activation of a head or forward end igniter activates the gas generator. Presure of the gas produced by the generator ruptures the membrane seal, destroys the flame inhibiting barrier, and causes ignition of the second or outer layer of propellant.

In each of the foregoing prior art patents, the flame inhibiting or thermal barrier is destroyed by being ruptured and blown out of the rocket motor nozzle to enable ignition of the next adjacent propellant layer.

U.S. Pat. No. 3,340,691 granted on Sept. 12, 1697 to G. F. Magnum and U.S. Pat. No. 3,354,647 granted on Nov. 28, 1967 to W. C. Aycock disclose similar arrangements but involve the admission of liquid fuel to the combustion chamber for the destruction of the flame inhibiting barrier and the ignition of the adjacent layer of propellant.

U.S. Pat. No. 3,888,079 granted on Jun. 10, 1975 to W. H. Diesinger discloses a rocket motor having two coaxial combustion chambers, tandemly arranged and each containing a solid propellant charge. A partition or bulkhead is positioned between the two chambers. The partition has closure means for preventing ignition of the second propellant charge during ignition of the first propellant charge and for allowing through flow due to pressure generated by ignition of the second propellant charge.

U.S. application Ser. No. 498,603, filed on May 26, 1983 by M. Fling et al and assigned to the assignee of the present invention, discloses a solid propellant rocket motor which incorporates a plurality of concentrically or tandemly fabricated combustion chambers that are separated by a perforated bulkhead, with each of the chambers containing an individually associated propellant charge and igniter. A pressure responsive membrane positioned in a first one of the chambers closes the perforations in the bulkhead to preclude communication between the chambers when a substantially higher pressure is present in the first one of the chambers than in the second chamber, and allows communication between the chambers when the pressures in the chambers is reversed.

The prior art restartable radial pulse rocket motors utilizing multiple ignition and propellant systems that can be ignited at different intervals to provide more than one pulse, for example, a "boost" and a "sustain" pulse, have a number of problems. On the whole, they are overly complex and require complicated mechanisms and structures that do not interface readily with state-of-the art arm-fire devices, that add undesirably to the weight, bulk or cost of fabrication and installation or assembly and/or detract from the reliability thereof under the low temperatures and vacuum conditions encountered in outer space, particularly after long periods of storage, and that are subject to the possibility of damage resulting from the rupture and destruction of the flame inhibiting or thermal barrier and the subsequent blowing out thereof through the nozzle of the rocket motor.

SUMMARY OF THE INVENTION

An object of the invention is to provide an improvement in radial pulse rocket motors that overcomes the foregoing problems of the prior art.

Another object of the invention is to provide an improved radial pulse rocket motor having tandemly arranged boost and sustain propellants separated by a thermal barrier, and in which upon completion of the boost phase, activation of a sustain igniter causes the thermal barrier to be inverted for retention within the motor in the space previously occupied by the boost propellant and exposure of the sustain propellant for ignition and radial burning.

A further object of the invention is to provide an improved igniter for the sustain phase of radial pulse rocket motors that is lighweight, compact, reliable and inexpensive to manufacture and install, and moreover, that is consumable, capable of operating under low temperature and vacuum conditions, and is capable of interfacing with state-of-the art arm-fire devices.

In accomplishing these and other objectives of the invention, there is provided a radial pulse motor having an elongated combustion chamber with a nozzle at the aft end and a multiple pulse arm-fire device at the forward end. In the aft end thereof, the combustion chamber contains a hollow boost propellant. A hollow sustain propellant is contained in the forward end of the combustion chamber with substantially the whole of the inner surface of the sustain propellant being covered by a thermal barrier, in close contact therewith. A consumable boost igniter that is suitably supported in the interior space of the boost propellant is connected to the multiple pulse arm fire device by an energy transfer line. Surrounding the arm-fire device is an annular sustain igniter which also is connected to the arm-fire device by an energy transfer path.

The sustain igniter includes a consumable, molded, polyurethane case having two cylindrical and concentrically arranged interlocking tubes with an elongated ringlike space or annulus that contains a thin sheet of igniter propellant wrapped around and bonded to the inner tube. The igniter may be assembled and installed during final assembly of the rocket motor. If desired, however, the sustain igniter may be pre-assembled, positioned at any desired location within the motor and cast in place.

Upon completion of the burning of the boost propellant grain and subsequent initiation of the sustain igniter, the operation of the sustain igniter produces a gaseous pressure externally of the forward end of the thermal barrier, which pressure is effective to turn the barrier inside out, that is, invert it, and in effect, deposit the barrier in the space previously occupied by the boost propellant grain.

The various features of novelty which characterize the present invention are pointed out with particularity in the claims annexed to and forming a part of this specification. For a better understanding of the invention, its operating advantages, and specific objects attained by its rise, reference is made to the accompanying drawings and descriptive matter in which a preferred embodiment of the invention is illustrated.

DESCRIPTION OF THE DRAWINGS

With this summary of the invention, a detailed description follows with reference being made to the accompanying drawings which form part of the specification, of which.

DESCRIPTION OF THE PREFERRED EMBODIMENT

Figure 1:
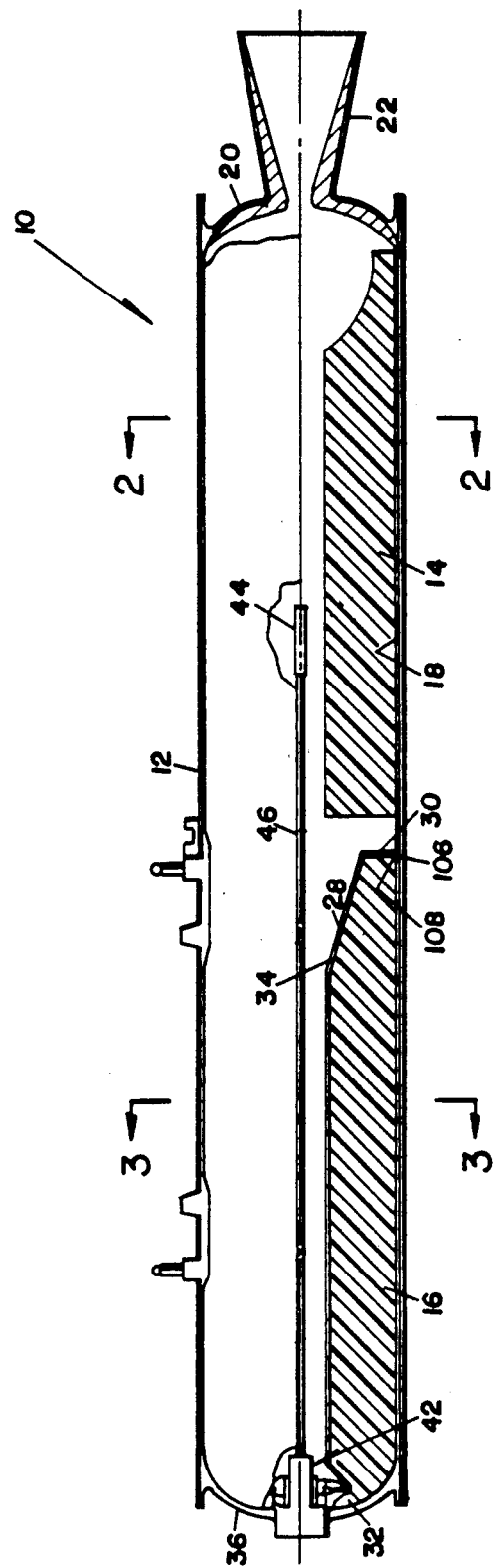
FIG. 1 is a longitudinal view, in partial section, of a radial pulse rocket motor.

Referring to FIG. 1 of the drawings, the reference numeral 10 is used to generally designate a solid propellant radial pulse rocket motor. The motor 10 includes an elongated cylindrical casing 12 containing therein an elongated solid propellant boost grain 14 and an elongated solid propellant sustain grain 16. Casing 12, which may be made of any suitable material, for example steel, desirably includes a liner 18 of rubber or other suitable compound bonded to the interior wall thereof. Liner 18 separates the boost grain 14 and the sustain grain 16 from the interior wall of casing 12.

Figure 2:
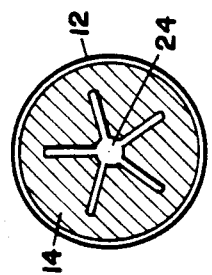
FIG. 2 is a view taken along the lines 2—2 of FIG. 1.

At the aft end 20 of casing 12 is an opening forming a nozzle 22 of the motor 10. Boost grain 12, which as best seen in FIG. 2, has an interior opening 24 of star configuration, is positioned in casing 12 adjacent the aft end 20 thereof.

Figure 3:
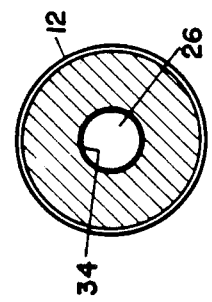
FIG. 3 is a view taken along the lines 3—3 of FIG. 1.

Spaced a short distance from boost grain 14 and forwardly thereof in casing 12 is sustain grain 16. The shape of the interior opening 26 of sustain grain 16, as best seen in FIG. 3, is cylindrical for substantially the entire length thereof, a radially outwardly tapered portion 28 being provided, however, adjacent the aft end 30 of the sustain grain 16. Completely covering the aft end 30 and the whole of the surface of the interior opening 26 of sustain grain 16, except for a portion 32 thereof at the forward end of the sustain grain 16, is a tubular thermal barrier 34. The thermal barrier 34 may be made of any suitable material, a preferred material being EPDM, a terpolymer elastomer made from ethylene-propylene diene monomer elastomer.

Figure 4:
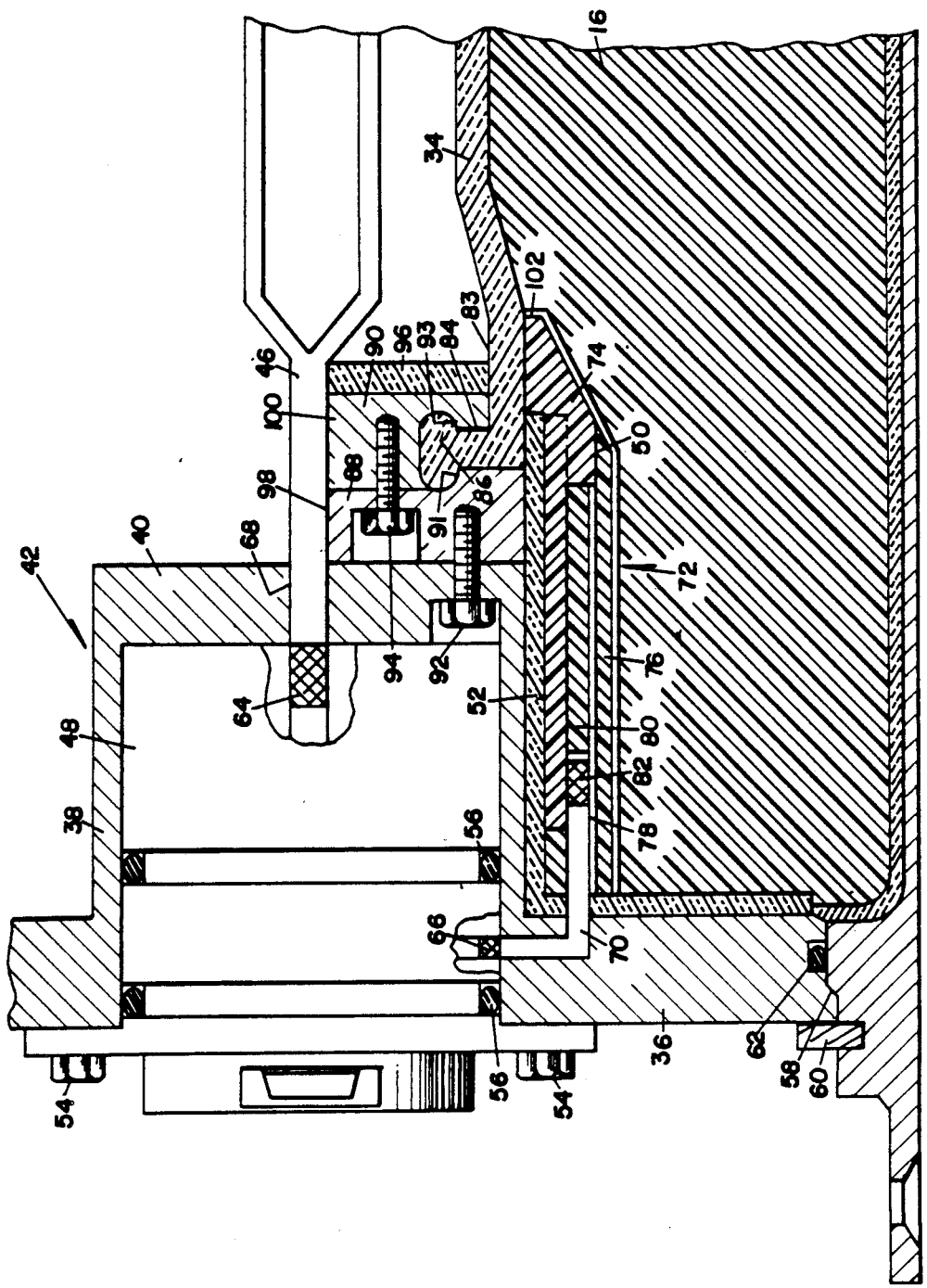
FIG. 4 is a cross sectional view of the arm-fire device and sustain igniter of FIG. 1

At the extreme forward end of casing 12 of motor 10, as best seen in FIG. 4, is a circular bulkhead 36 having an aftwardly extending tubular reentrant portion 38 with a closed inner end 40. Bulkhead 36 may be made of any suitable material, steel being preferred. Suitably mounted within the reentrant portion 38 in bulkhead 36 is an igniting device 42. Igniting device 42 comprises a multiple arm-fire device and a sustain igniter and is described further hereinafter.

A boost igniter 44 that may comprise a pyrogen, or if feasible, a pyrotechnic igniter, is suitably positioned and supported by means (not shown) within the interior opening 24 of the boost grain 14. Igniter 44 may be connected for initiation to the igniting device 42 by a Hivelite fuze or a "TLX" transfer line, designated 46. A Hivelite fuze is a product of Teledyne McCormick-Selth, 3601 Union Road, P.O. Box 6, Hollister, Calif, and comprises a rapidly burning material that is encased in a lead sheath having a polyethylene jacket. A "TLX" transfer line is a product of Explosive Technology, a Subsidiary of OEA, Inc. Fairfield, Calif. This type of transmission line comprises a hollow tube having a reactive substance coating the inner surface thereof. The coating is operative to support and propagate a gaseous percussion wave throughout the length of the tube.

By reference to FIG. 4, it will be seen that the igniting device 42 comprises a multiple pulse arm-fire device, designated 48, and a sustain igniter, designated 50. The sustain igniter 50 is tubular in form and is disposed in surrounding relation to the arm-fire device 48 and the tubular reentrant portion 40 of the bulkhead 36, being separated from the bulkhead 36 and tubular reentrant portion 40 by suitable insulation 52.

Multiple pulse arm-fire device 48 is fixedly secured within the tubular reentrant portion 38 of bulkhead 36 in any suitable manner, as for example by bolts 54. O-rings 56, as shown, may be provided for sealing the arm-fire device 48 therein. Bulkhead 36, which is circular, is retained within a mating circular opening 58 in the forward or head end of casing 12 by a snap ring 60. An O-ring 62 may be provided for sealing bulkhead 36 in opening 58.

Multiple pulse arm-fire device 48 may comprise two separate igniters, a boost initiator and a sustain initiator, with some form of safe-arm device (not shown), as known in the art, to prevent the solid propellant within motor 10 from being accidentally ignited. Each such igniter or initiator may include an electric squib (not shown) and pyrotechnic material (not shown), as disclosed, for example in the aforementioned application for patent of M. Fling et al, for initiating respectively associated pickup charges 64 and 66. Charge 64 is located in arm-fire device 48 adjacent the closed end 40 of bulkhead 36 while charge 66 is located therein adjacent a forward peripheral part thereof. Each of the pickup charges may comprise a suitable pyrotechnic material. Any one of a number of pyrotechnic materials may be used for charges 64 and 66, a typical material being a granular mixture of 25% by weight of boron and 75% of potassium nitrate.

The forward end of fuze of transfer line 46 extends through an opening 68 in the closed end 40 of bulkhead 36 into operative engagement with the pickup charge 64. The other or aft end of line 46 is connected to the boost igniter 44, as previously noted.

The sustain igniter 50 is ignited directly from the sustain initiator of the arm-fire device 48. Thus, pickup charge 66 is connected by an energy transfer path 70 to the sustain igniter 50.

Sustain igniter 50 comprises a consumable, molded, polyurethane case 72 having two cylindrical interlocking tubes 74 and 76 with a 0.10 inch (2.5 mm.) wide annulus 78 therebetween. Contained within the annulus 78 is thin sheet of high energy igniter propellant 80 and is wrapped around and bonded to the inner tube 74. An igniter propellant charge 82 of boron an potassium nitrate, as above described, may be provided in the annulus 78 between the exit end of the energy transfer path 70 and the igniter propellant 80.

It will be understood that the sustain igniter 50 may be assembled and installed during final assembly of the motor; however, the igniter 50 may be pre-assembled, positioned at any desired location within the motor 10 and cast in place. For facilitating ignition of igniter 50, the energy transfer path 70 desirably may include a Hivelite fuze or TLX transfer line identical to the fuze or line 46.

Multiple arm-fire device 48 and sustain igniter 50 are contained within the portion of the interior opening 26 of the sustain grain 16 that is not covered by the tubular thermal barrier 34. The forward end of the thermal barrier 34, as shown, flares radially outwardly and includes adjacent the forward end thereof a short cylindrical portion 83 that extends into and is closely engaged by the inner surface of the inner one, 74, of the cylindrical interlocking tubes of the sustain igniter 50.

The radially outward tapering forward end of the thermal barrier 34, as shown, conforms in shape to the adjacent radially outward tapering of the interior opening 26 of the sustain propellant gram 16. At the extreme forward portion of the cylindrical portion 83, the thermal barrier 34 includes an annular portion 84 having a doughnut-shaped portion 86 defining the inner-circumference thereof.

Annular portion 84 and doughnut-shaped portion 86 are captured between two circular plates 88 and 90 which may be made of any suitable material, steel being preferred. As shown, the adjacent faces of plates 88 and 90 are provided with grooves 91 and 93 that, in cooperation, match the configuration of the doughnut-shaped portion 86. Plate 88 is secured to the aft side of the end 40 of bulkhead 36 by a plurality of bolts 92 (one only of which is shown) that extend into the plate 88 from countersunk holes in the forward side of the end 40 of bulkhead 36. Similarly, plate 90 is secured to the aft side of plate 88 by plurality of bolts 94 (one only of which is shown) that extend into the plate 90 from countersunk holes in the forward side of plate 88. An insulating layer 96 may be provided on the aft surface of plate 90, as shown, to protect the plate 90 against the flaming and corrosive gases in the rocket motor combustion chamber. Insulation 96 and plate 90 serve as a seal for the inner forward end of the tubular barrier 34 upon ignition and burning of the boost propellant grain 14. The energy transfer line 46 from the pickup charge 64 in the arm-fire device 48 to the boost igniter 44 extends through openings 98 and 100 in the plates 88 and 90 in addition to the opening 68 in end 40 of bulkhead 36.

Figure 5:
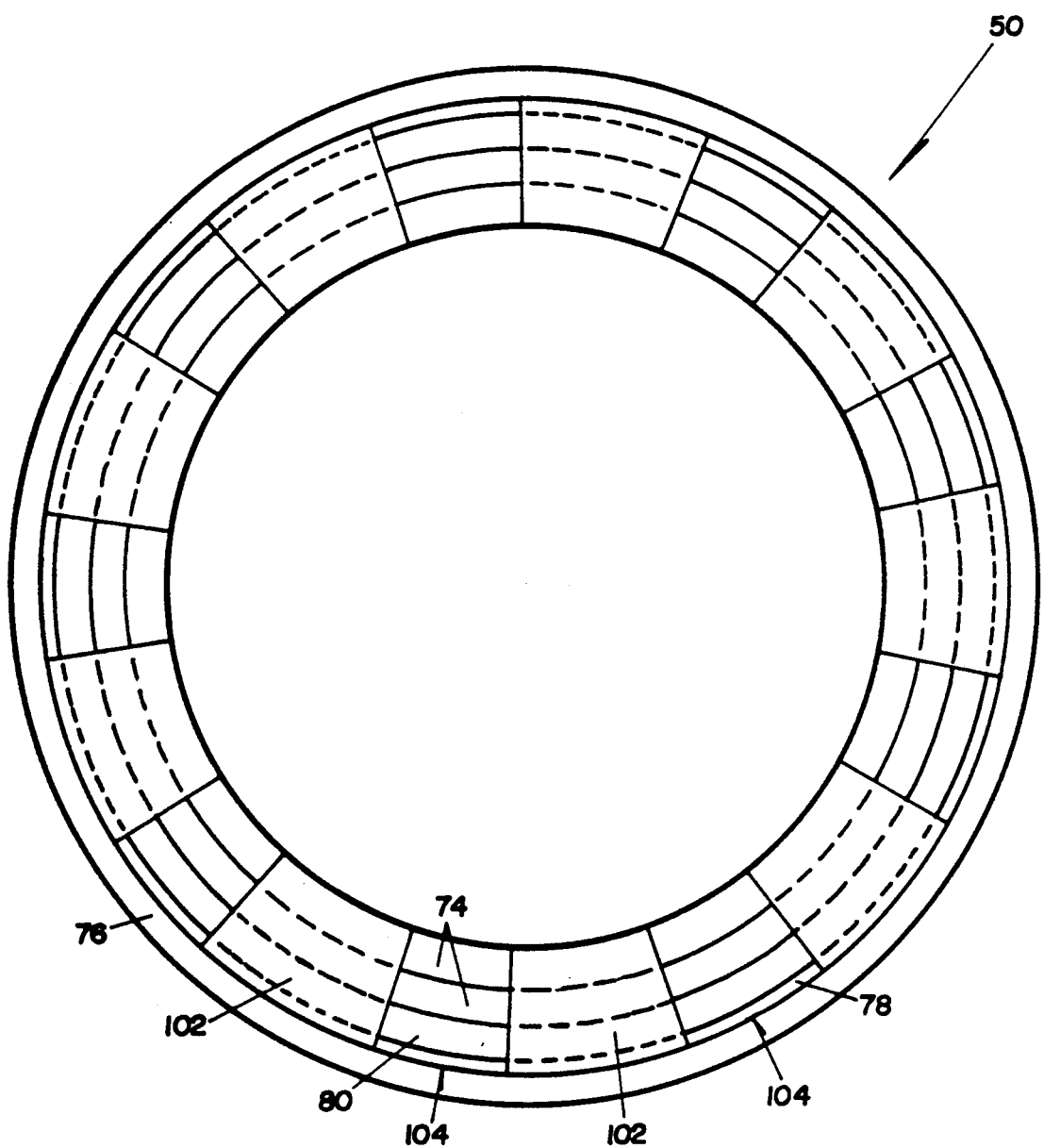
FIG. 5 is an aft end view of the sustain igniter.

As best seen in the aft end view of the sustain igniter 50 shown in FIG. 5, the aft end 102 of the inner cylindrical tube 74 of the sustain igniter 50 is provided with circumferentially spaced slots 104 to provide exit passages for the flow of gas generated as a result of the ignition of the sustain igniter propellant 74. Slots 104 are located between the aft ends of the inner and outer cylindrical tubes 74 and 76. As is explained in greater detail hereinafter, an initial effect of inition of the sustain igniter 50 is to turn the thermal barrier 34 inside out thereby to expose substantially the whole of the inner surface of the sustain propellant grain 16 to the sustain igniter flame.

In the operation of the radial rocket motor 10, initiation of the boost igniter 40, by the multiple pulse arm-fire device 48 results in ignition and burning of the boost propellant grain 14, such burning continuing until the boost propellant grain 14 is entirely consumed, to provide rocket motor boost pulse. During such burning of the boost propellant grain 14, the sustain propellant 16 is protected from the flaming boost propellant gases by the tubular thermal barrier 34.

Subsequent ignition of the sustain igniter 50 responsively to initiation by the multiple pulse arm-fire device 48 cause a flow of flaming gases under pressure outwardly of the slots 104 in the end 102 of the sustain igniter inner tube 74. Such flow of gases under pressure is operative to rupture the tubular thermal barrier 34 adjacent the aft end of circular plate 88, thereby separating the barrier 34 from the sustain igniter 50. It is further operative to lift the ruptured end of the barrier 34 out of contact with the inner tubular surface of the sustain igniter 16 and to peel the thermal barrier 34 off the interior surface of the sustain propellant grain 16, thus turning the thermal barrier 34 inside out, or inverting it. As a result of such inversion, the thermal barrier 34 is deposited in the aft end of the rocket motor casing 12, specifically, in the space previously occupied by the boost propellant 14. For guarding against the possibility of the thermal barrier being blown out of the rocket motor combustion chamber and through the nozzle 22, the aft end 106 of the thermal barrier 34 may fixedly attach to the aft end of the sustain propellant grain 16 and or to the interior wall of the rocket motor casing 12 in any suitable manner, for example, by a suitable adhesive 108.

Thus, in accordance with the invention, there has been provided an improved radial pulse rocket motor having boost and sustain propellant grains separated by a thermal barrier to enable the production of separate boost and sustain pulses, and in which upon completion of the boost phase, activation of a sustain igniter causes the thermal barrier to be inverted for retention within the rocket motor in the space previously occupied by the boost propellant grain, thus avoiding possible damage to the motor that might result if the thermal barrier were allowed to be blown out of the motor through the motor nozzle while effecting exposure of the sustain propellant grain for ignition by the flaming gases produced by the sustain igniter.

There is also provided, according to the invention, an improved igniter for the sustain phase of a radial pulse rocket motor, which sustain igniter is lightweight, compact, reliable (having unlimited storage life) and inexpensive to manufacture and install. The improved sustain phase igniter, moreover, is consumable, capable of operating under low temperature and vacuum conditions, capable of interfacing with state-of-the art arm-fire devices, and versatile, being capable of being adapted to most radial pulse motors.

With this description of the invention in detail, those skilled in the art will appreciate that modifications may be made to the invention without departing from its spirit. Therefore, it is not intended that the scope of the invention be limited to the specific embodiment illustrated and described. Rather, it is intended that the scope of the invention be determined 20 by the appended claims and their equivalents.

What is claimed is:

1. A radial pulse rocket motor including, in combination:
    an elongated cylindrical casing having a nozzle formed in the aft end and a bulkhead at the forward end, said bulkhead having a reentrant portion,
    a hollow elongated boost propellant grain positioned in the aft end of said casing,
    a hollow elongated sustain propellant grain positioned in the forward end of said casing, said sustain grain being spaced from said boost grain,
    a thermal barrier having a forward end and aft end and substantially covering the whole of the interior surface of said sustain propellant,
    a multiple pulse arm-fire device mounted within said reentrant portion of said bulkhead, said arm-fire device having a boost initiator and a sustain initiator,
    a boost igniter positioned within the hollow boost propellant grain for igniting said boost propellant grain,
    a sustain igniter having a forward end and an aft end and positioned said hollow sustain propellant grain adjacent the forward end thereof for igniting said sustain propellant grain, said sustain igniter having at least a portion of the aft end in surrounding relationship with an extreme forward portion of said thermal barrier, whereby upon initiation of said sustain igniter said thermal barrier is separated from said sustain igniter and turned inside out to expose said sustain propellant grain to the flaming gases produced by said sustain igniter, and
    energy transmission means providing separate energy transmission paths from said arm-fire device boost initiator to said boost igniter and from said arm-fire sustain initiator to said sustain igniter.

2. A radial pulse rocket motor, as defined by claim 1, wherein said enerby transmission means comprises a first Hivelite fuze connecting said arm-fire device boost initiator to said boost igniter and a second Hivelite fuze connecting said arm-fire device sustain initiator to said sustain igniter.

3. A radial pulse rocket motor, as defined by claim 1, wherein said energy transmission means comprises a first TLX transmission line connecting said arm-fire device boost initiator to said boost igniter and a second TLX transmission line connecting said arm-fire sustain initiator to said sustain igniter.

4. A radial pulse rocket motor, as defined by claim 1, wherein the interior surface of said hollow elongated sustain grain has a generally cylindrical configuration and said thermal barrier is tubular in form.

5. A radial pulse rocket motor, as defined in claim 1, wherein said sustain igniter is positioned in surrounding relation with respect to said reentrant portion of said bulkhead.

6. A radial pulse rocket motor, as defined by claim 4, wherein said reentrant portion of said bulkhead is cylindrical in form,
    wherein said sustain igniter is cylindrical form and is positioned in surrounding relation with respect to said reentrant portion of said bulkhead.

7. A radial pulse rocket motor, as defined by claim 6, further including means for securing the extreme forward end of said thermal barrier to said reentrant portion of said bulkhead whereby upon initiation of said sustain igniter by said arm-fire device the resulting gaseous pressure ruptures the thermal barrier at a location adjacent the said reentrant portion of said bulkhead and thereby separates said thermal barrier from said reentrant portion and causes said thermal barrier to be peeled aftwardly from the inner surface of such sustain propellant grain, turned inside out, and deposited in an aft portion of said rocket motor casing.

8. A radial pulse rocket motor, as defined by claim 7, further including means to fixedly attach the aft end of said thermal barrier to the aft end of said sustain propellant grain thereby to prevent said thermal barrier, when turned inside out, from being blown out of the rocket motor through the nozzle.

9. A radial pulse rocket motor, as defined in claim 6, wherein said sustain igniter comprises inner and outer cylindrical inner and outer interlocking tubes defining an annulus therebetween, and
    wherein a thin sheet of igniter propellant is contained within said annulus, being wrapped around and bonded to the inner one of the cylindrical tubes, and
    wherein said inner tube has circumferentially located slots at the aft end thereof for allowing flaming gases, produced as a result of ignition of said sheet of igniter propellant to flow out of the aft end of said sustain igniter to rupture and separate said thermal barrier from said reentrant portion of said bulkhead and to turn said thermal barrier inside out.

10. A radial pulse rocket motor, as defined by claim 9, wherein said cylindrical inner and outer tubes of sustain igniter are made of a consumable plastic material.

11. A radial pulse rocket motor, as defined by claim 9, wherein a pyrotechnic is contained within said annulus of said sustain igniter in operative association with said sheet of igniter propellant,
wherein said multiple pulse arm-fire device includes a first pickup charge and a second pickup charge, said first pickup charge being initiated by said boost initiator of said arm-fire device and said second pickup charge being initiated by said sustain initiator of said arm-fire device, and
Wherein said energy transmission means provides a first transmission path from said first pickup charge to said boost igniter for initiating said boost igniter and thereby for igniting said boost propellant grain and a second energy transmission path from said second pickup charge to said pyrotechnic for igniting said sheet of igniter propellant and thereby for igniting said sustain propellant grain.

12. A radial pulse rocket motor, as defined by claim 7, wherein said means for securing the forward end of said thermal barier to said reentrant portion of said bulkhead comprises a first plate and a second plate with the forward end of said thermal barrier being captured between said plates, said first plate being attached to the reentrant portion of said bulkhead and said second plate being attached to said first plate.

13. A radial pulse rocket motor, as defined by claim 12,
wherein said thermal barrier includes a doughnut-shaped portion at the forward end thereof, and
wherein the adjacent faces of said first and second plates are provided with grooves that cooperate to match the configuration of the doughnut-shaped portion of the forward end of said thermal barrier.

14. A sustain igniter having a forward end and an aft end for a radial pulse rocket motor comprising,
cylindrical inner and outer interlocking tubes defining an annulus therebetween, and
a sheet of igniter propellant contained within said annulus and wrapped around and bonded to the inner one of said cylindrical tubes,
said innter tube having circumferentially located slots at the end thereof for allowing discharge from said sustain igniter of flaming gases produced as a result of ignition of said sheet of igniter propellant.

15. A sustain igniter, as defined by claim 14 further including a pyrotechnic charge for initiating said sheet of igniter propellant.

16. A sustain igniter, as defined by claim 14, wherein said cylindrical inner and outer interlocking tubes are made of a consumable plastic.

17. A sustain igniter, as defined by claim 14, wherein said cylindrical inner and outer interlocking tubes are made of polyurethane.

18. An igniting device for an elongated radial pulse rocket motor having a forward end and an aft end and having a boost propellant grain and a longitudinally separated sustain propellant grain with an elongated thermal barrier covering said sustain propellant grain and separating said sustain propellant grain from flaming gases produced by burning of said boost propellant grain, said igniting device having an aft end and including,
a multiple pulse arm-fire device, said arm-fire device including a boost initiator and a sustain initiator, a first pickup charge associated with said boost initiator, and a second pickup charge associated with said sustain initiator,
means for supporting said arm-fire device on said radial pulse motor comprising a bulkhead adapted to be mounted on the forward end of said radial pulse motor, said bulkhead having a hollow cylindrical reentrant portion containing said arm-fire device,
a sustain igniter for the sustain propellant grain of the radial pulse motor comprising cylindrical inner and outer interlocking tubes defining an annulus therebetween, positioned in surrounding concentric relation with respect to said cylindrical reentrant portion of said bulkhead, and inlcuding a pyrotechnic and an operatively associated sheet of igniter propellant in said annulus, said sheet of propellant being·wrapped around and bonded to the inner one of said cylindrical tubes, and
first and second energy transmission means,
said first pickup charge in said arm-fire device being adapted for connection by said first energy transmission means to boost igniter means for said boost propellant grain in said radial pulse motor, and said second pickup charge in said arm-fire device being adapted for connection by said second energy transmission means to said pyrotechnic in said annulus of said sustain igniter.

19. An igniting device, as defined by claim 18,
whrein said cylindrical inner and outer interlocking tubes of said sustain igniter extend further aft with respect to the radial pulse rocket motor than the reentrant portion of said bulkhead in which said arm-fire device is mounted whereby the aft end of said sustain igniter is adapted to be disposed in surrounding relation with the forward end of the tubular thermal barrier means that are provided to preclude burning of the sustain propellant grain during burning of the boost propellant grain.

20. An igniting device, as defined by claim 19, wherein the cylindrical inner and outer interlocking tubes of said sustain igniter are made of a consumable plastic.

* * * * *